3,509,209
HYDROCARBOXYLATION OF CERTAIN
CONJUGATED DIOLEFIN COMPOUNDS
Donald M. Fenton, Anaheim, Calif., assignor to Union
Oil Company of California, Los Angeles, Calif., a corporation of California
No Drawing. Filed Jan. 12, 1967, Ser. No. 608,732
Int. Cl. C07c 51/14
U.S. Cl. 260—533   7 Claims

ABSTRACT OF THE DISCLOSURE

Conjugated diolefins are reacted with carbon monoxide and water in the presence of a Group VIII noble metal catalyst to prepare carboxylic acids and lactones. A specific embodiment comprises the preparation of adipic acid from butadiene.

DESCRIPTION OF THE INVENTION

This invention relates to a hydrocarboxylation process and in particular relates to a method for the hydrocarboxylation of conjugated diolefins to prepare carbonyl derivatives therefrom including dicarboxylic acids, haloalkanoic acids, allylacetic acid and derivatives thereof. In a specific embodiment, this invention relates to the hydrocarboxylation of butadiene to prepare adipic acid.

The method of this invention comprises contacting a conjugated diolefin with carbon monoxide and water in the presence of a halogen acid and catalytic amounts of a Group VIII noble metal. The contacting is effected at relatively mild conditions including temperatures from 15° to about 300° C. and pressures from 1 to about 1000 atmospheres. The reaction can be stopped to recover a mixture of a a chloroalkanoic acid, allylacetic acid and alkyl derivatives thereof or 4-valerolactone and alkyl derivatives thereof. Preferably, however, the reaction is continued with further carboxylation of the reactant to obtain the dicarboxylic acid.

The following reaction illustrates the course of the hydrocarboxylation:

(I)

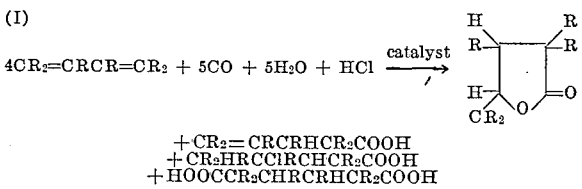

$4CR_2=CRCR=CR_2 + 5CO + 5H_2O + HCl \xrightarrow{\text{catalyst}}$

+CR$_2$=CRCRHCR$_2$COOH
+CR$_2$HRCClRCHCR$_2$COOH
+HOOCCR$_2$CHRCRHCR$_2$COOH

The crude monohydrocarboxylation reaction products of reaction I are in equilibrium and the continued hydrocarboxylation will provide for conversion of the reactant to the desired dicarboxylic acid.

The reaction can also be divided into two or more stages and this constitutes the preferred mode of practice of the invention. The first stage is conducted below about 100° C. while the second stage is conducted at higher temperatures. The diolefin is hydrocarboxylated and the hydrocarboxylation can be stopped after only one of the unsaturated sites has been hydrocarboxylated and the aforementioned allyl or chloro acids and lactones can be recovered. Preferably, however, the reaction is continued with further hydrocarboxylation to prepare a dicarboxylic acid.

The reactant employed in my invention is a conjugated diolefin having from about 4 to 20 carbons; preferably from about 4 to 12 carbons. Conjugated hydrocrabon olefins are a preferred reactant; however, other inert groups can be present on the diolefin and one or more of the R groups of the aforementioned diolefins can be alkyl, aryl, carboxylic, nitro, oxy or oxo. Examples of suitable hydrocarbon diolefins include butadiene, isoprene, 1,3-pentadiene, 1,3-hexadiene, 2-methyl-1,3-pentadiene, 3-methyl-1,3-pentadiene, 2,3-dimethyl-1,3-butadiene, 1,3-heptadiene, 2-methyl-1,3-hexadiene, 2,3- dimethyl-1,3-pentadiene, 2-ethyl-1,3-pentadiene, 3-ethyl-1, 3 - pentadiene, 3,5-octadiene, 1,3-diisopropyl-1,3-butadiene, 4,6-tetradecadiene, 5,7-hexadecadiene, 3,5-octadecadiene, etc. Aryl derivatives of the conjugated diolefins can also be reacte dincluding any of the following: 1 - phenyl - 1,3 - butadiene, 2 - phenyl-3-methyl-1,3-pentadiene, 1,4-diphenyl-butadiene, 3-m-tolyl-1,3-heptadiene, 2-p-tolyl-3-ethyl-1, 3-pentadiene, etc.

Various non-hydrocarbon groups can be present provided these materials are inert to the reactants, catalyst and products under the reaction conditions. An example of such inert materials are the various nitrated derivatives of any of the preceding hydrocarbons such as 1-nitro-3-methyl-1,3-pentadiene, 4-nitro-1,3-heptadiene, 2-nitro-2-ethyl-1,3-pentadiene, 2-nitro-4,6-tetradecadiene, etc.

Examples of other inert groups which can be present on the conjugated diolefin reactant include oxygen-containing radicals such as esters and carboxylic acids. Examples of oxo groups which can be included on the reactant diolefin include the carboxylic acids and lower alkyl (1–10 carbons) esters thereof. Examples of suitable acids include any of the following carboxylic acid derivatives of the aforementioned hydrocarbon diolefins: 1-carboxy-1,3-butadiene, 3-carboxy-1,3-pentadiene, 3-carboxy-3,5-octadiene, etc. Other useful reactants include the lower alkyl esters of the carboxylic acids of any of the aforementioned hydrocarbons such as 2-methoxycarbonyl - 1,3-butadiene, 3-ethoxycarbonyl-3,5-octadiene, etc.

The reaction is performed in the presence of an aqueous hydrohalic acid such as aqueous hydrochloric or aqueous hydrobromic acids. The hydrohalic acid is employed in concentrations from about 1 to about 50 weight percent, preferably from about 5 to about 25 weight percent in the reaction medium.

The reaction is performed under liquid phase conditions in the presence of the aqueous reaction medium which can optionally contain up to about 80 weight percent of an inert organic solvent such as carboxylic acid, hydrocarbon, amide, ketone or ether.

Illustrative of the carboxylic acids that can be included in the reaction medium include carboxylic acids such as benzoic, phenylacetic, acetic, propionic, butyric, isobutyric, pentanoic, hexanoic, pivalic, heptanoic, octanoic, toluic, phthallic acids, etc. Other organic solvents that can be employed include the alkyl and aryl sulfone such as diisopropyl sulfone, butyl amyl sulfone, methyl benzyl sulfone, etc. Various amides can also be included in the reaction medium if desired such as N,N-dimethyl formamide, N,N-ethylisopropyl formamide, acetamide N-phenyl acetamide, isobutyramide, isovaleramide, isocaprylamide, N-caprylamide, N-propyl-heptanoylamide, isoundecylamide, etc.

Ethers can also be employed as a reaction solvent such as diisopropyl ether, di-n-butyl ether, ethylene glycol di-iso-butyl ether, methyl-o-tolyl ether, ethylene glycol dibutyl ether, di-iso-amyl ether, ethylene glycol di-isoamyl ether, diethylene glycol diethyl ether, ethyl benzyl ether, diethylene glycol dimethyl ether, ethylene glycol diphenyl ether, triethylene glycol diethyl ether, tetraethylene glycol dimethyl ether, tetraethylene glycol dibutyl ether, etc.

Various esters can also be employed as a solvent, e.g., ethyl formate, methyl acetate, ethyl acetate, butyl formate, ethyl propionate, sec-butyl acetate, iso-butyl acetate, butyl acetate, ethyl formate, glycol diformate, cyclohexyl acetate, furfural acetate, diethyl oxalate, methyl benzoate, diethyl malonate, valerolactone, ethylbenzoate, methyl salicylate, dibutyl oxalate, dimethyl phthalate, benzobenzoate, dibutyl phthalate, etc.

The catalyst for the hydrocarboxylation is a Group VIII noble metal. The noble metal can be of the platinum subgroup including platinum, osmium, or iridium, or the palladium subgroup including palladium, ruthenium or rhodium. Of the preceding noble metals, palladium is preferred for its demonstrated greater activity. The Group VIII noble metal can be employed in an amount between about 0.001 and about 5 weight percent of the liquid reaction medium; preferably between about 0.04 and about 2.0 weight percent. The concentration of the platinum group metal in the reaction medium is not critical to the reaction since this material functions as a true catalyst.

The platinum group metal can be added to the reaction medium as a finely divided metal, as a soluble salt or as a chelate. Examples of suitable salts are the halides and carboxylates of the metals such as platinum chloride, rhodium acetate, ruthenium bromide, osmium propionate, iridium benzoate, palladium isobutyrate, palladium chloride, etc. Examples of suitable chelates are palladium acetylacetonate, and complexes of palladium with such conventional chelating agents as ethylene diamine tetraacetic acid, citric acid, etc.

The catalyst can also be distended on a solid carrier for use in the reaction. To illustrate, an inert solid, i.e., one that is non-reactive with the reactants, products and solvents under the reaction conditions, can be impregnated with catalytic amounts of the Group VIII noble metal. Examples of suitable solids include silica, alumina, titania, zirconia, aluminum silicates such as clays, zeolites, molecular sieves, etc. The catalyst can be impregnated by precipitation of the noble metal onto the carrier from a solution of a soluble salt of the noble metal. This can be accomplished in a conventional manner by evaporation of the solvent or reduction of the solution manner by evaporation of the solvent or reduction of the solution by contacting it with a reducing agent. A suitable reducing agent would be carbon monoxide or a gaseous olefin such as ethylene, propylene, etc. The carrier can be used in particulate form with particle sizes from about ¼-inch diameter to about 1 micron, as desired. Generally, particles from ⅛ to ½₂ inch diameter can be used. The particles are impregnated with from 0.01 to 10 weight percent of the Group VIII noble metal; preferably from 0.1 to about 1.0 weight percent.

If desired, an iron cocatalyst can also be used. The cocatalyst can be added to the reaction zone or distended on the carrier as a soluble iron salt, e.g., ferric or ferrous halides or carboxylates such as ferric chloride, ferrous bromide, ferric acetate, ferrous valerate, etc. The iron cocatalyst can also be added as finely divided metal or as the carbonyl, triirondodecylcarbonyl. Since iron functions as a catalyst, catalytic quantities can be used, from about 0.001 to 5.0 weight of the liquid reaction medium or from about 0.01 to 10 weight percent of the impregnated solid carrier.

The reaction is performed under liquid phase conditions at a temperature from about 15° to 300° C.; preferably from about 25° to 200° C. Sufficient pressure is maintained on the reaction system to insure that the reaction medium is maintained in liquid phase at the chosen reaction temperature. Pressures from about 1 to 1000 atmospheres, preferably from about 10 to 200 atmospheres are preferred. The higher pressures favor the carboxylation reaction by increasing the solubility of the carbon monoxide reactant in the liquid phase. Accordingly, it is desired that the partial pressure of the carbon monoxide comprise at least 1 to about 200 atmospheres. The carbon monoxide can be diluted if desired with suitable inert gases such as nitrogen, helium, carbon dioxide, etc.

The preferred mode of practicing the invention continuous fashion. When operating batchwise, the reaction medium containing the catalyst and hydrohalic acid is charged into the reaction zone together with the conjugated diolefin reactant and the reaction zone is then pressured with the carbon monoxide reactant and heated to the desired reaction temperature. When practicing the invention in a continuous fashion, the reaction medium containing the catalyst and the hydrohalic acid can be circulated through a reaction zone maintained at the chosen temperature and pressure wherein it is contacted with the conjugated diolefin and carbon monoxide reactants. The product can be continuously recovered from the reaction medium which is withdrawn from the reaction zone by any suitable technique such as distillation, solvent extraction or extractive distillation.

The preferred mode of practicing the invention comprises a stepwise sequence wherein the conjugated diolefin is reacted at a temperature from 15° to 100° C.; preferably from 20° to 75° C. Sufficient time is permitted for the addition of the carbon monoxide and water to the diolefin. The reaction can be monitored by observing the rate of disappearance of the reactant or the formation of acids or lactones from the conjugated diolefin. This can be simply followed by watching the rate of pressure decrease. The reaction is favored by the presence of hydrobromic or hydrochloric acid and preferably concentrated hydrochloric acid of about 1 to about 12 normal is employed for this reaction.

When the diolefin has been carboxylated to the desired extent, the reactants are thereafter contacted with carbon monoxide at more elevated temperatures. In this contacting, temperatures from about 70° to about 300° C. can be employed; preferably from about 75° to 200° C. are employed. In both stages the pressures are about equal and the carbon monoxide can be employed at a pressure from about 1 to about 1000 atmospheres, preferably from about 10 to about 200 atmospheres. This hydrocarbonylation reaction proceeds to give dicarboxylic acids and the progress of the reaction can be monitored by observing the rate of carbon monoxide absorption.

The aforementioned stepwise practice of the invention can be performed batchwise or in a continuous fashion. In the continuous processing which is the preferred embodiment, the reaction medium containing the catalyst and hydrohalic acid can be circulated between the two reaction stages where in the diolefin is hydrocarboxylated.

The crude reaction product withdrawn from the hydrocarboxylation reactor will contain a mixture of the desired dicarboxylic acid with chloroalkanoic acids, allyl acetic acid and derivatives thereof, and 4-valerolactone and derivatives thereof. This crude reaction product can be processed to recover the desired product therefrom such as the dicarboxylic acid and the other products can be returned to the second stage carboxylation zone for further reaction to the desired dicarboxylic acid. These intermediate products, however, will often be of commercial value themselves, e.g., the chloroalkanoic acids and lactone derivatives are useful as solvents. Accordingly, all or any of these intermediate products can be recovered as products of the hydrocarboxylation reaction.

The invention will now be illustrated by the following exemplified disclosure:

Example 1

A tantalum lined autoclave was charged with 50 milliliters concentrated hydrochloric acid (37 weight percent HCl), 1 gram palladous chloride and 105 grams butadiene. The autoclave was closed and pressured with carbon monoxide to 800 p.s.i. and then heated to 150° C. and maintained at that temperature for 2 hours while rocking. The autoclave was then heated to 200° C. and maintained at that temperature, while rocking, for an additional 2 hours. The autoclave was then cooled, depressured and opened and the liquid contents were treated to recover 8 grams of 4-valerolactone.

Example 2

Adipic acid was prepared by charging 50 milliliters acetic acid, 25 milliliters concentrated hydrochloric acid, 1 gram palladium chloride, 1 gram ferrous chloride tetrahydrate and 70 grams 1,3-butadiene to a tantalum bomb. The bomb was closed and pressured to 1000 p.s.i. with carbon monoxide. The bomb was rocked, heated to 100° C. and maintained at that temperature for 2 hours and then heated to 175° C. and maintained at that temperature for 2 hours. The bomb was cooled, its pressure observed as 625 p.s.i., depressured, opened and its liquid contents were filtered. To the filtrate was added 100 milliliters ethyl ether and 100 milliliters water. The organic layer was separated, washed with 100 milliliters of water and distilled to obtain 4 grams of white solid having melting point 152° C. and a boiling point of 130° C./0.5 mm. mercury. The infrared spectrum was consistent with that of adipic acid.

Example 3

The bomb was charged with 75 milliliters acetic acid, 25 milliliters hydrochloric acid, 0.5 gram palladium chloride and 60 grams 1,3-butadiene. The bomb was closed, pressured to 1000 p.s.i. with carbon monoxide, then rocked at room temperature for 24 hours. The bomb was then heated to 100° C. and maintained at that temperature for 3 hours and then heated to 180° C. and maintained at that temperature for 3 hours. The resulting liquid product was analyzed by gas chromatography to determine a yield of 4 grams alpha-valerolactone and 1 gram allyl acetic acid.

Example 4

The bomb was charged with 50 milliliters acetic acid, 25 milliliters concentrated hydrochloric acid, 0.5 gram palladium chloride, 1 gram ferrous chloride and 70 grams butadiene. The bomb was closed, pressured to 1000 p.s.i. with carbon monoxide, then heated to 100° C. and maintained, while rocking, at that temperature for 6 hours. The bomb was cooled, its pressure observed as 700 p.s.i., opened and the liquid contents were distilled to recover 7 grams pentenoic acid, boiling point 50°–60° C./1 mm. mercury; $N_D^{25}=1.4370$; calculated for $C_5H_8O_2$, C=60.0, H=8.1; found C=59.7, H=8.2. A higher boiling component containing adipic acid was obtained.

Example 5

To the bomb was added 50 milliliters acetic acid, 25 milliliters concentrated hydrochloric acid, 0.5 gram palladium chloride, 1 gram triirondodecylcarbonyl and 70 grams, 1,3-butadiene. The bomb was closed, pressured to 1000 p.s.i. with carbon monoxide, rocked and heated to 125° C. and maintained at that temperature for 2 hours, then heated to and maintained at 175° C. for two hours. The product was distilled to isolate 12 grams pentenoic acid, $N_D^{29}=1.4353$.

Example 6

The bomb was charged with 50 milliliters concentrated hydrochloric acid, 1 gram palladium chloride and 105 grams 1,3-butadiene and pressured to 1000 p.s.i. with carbon monoxide. The bomb was rocked, heated to and held at 150° C. for 2 hours, then heated to and held at 200° C. for 2 hours. The final pressure after cooling was 200 p.s.i. The yield of product determined by vapor phase chromotography comprised 14 grams of alpha-valerolactone, identified by infrared and nuclear magnetic spectroscopy.

The experiment was repeated, substituting 75 milliliters concentrated hydrobromic acid for the hydrochloric acid previously used. The product comprised 8 grams alpha-valerolactone.

Example 7

The bomb was charged with 25 milliliters concentrated hydrochloric acid, 75 milliliters acetic acid, 0.5 gram palladium chloride and 80 grams 1,3-butadiene. The bomb was closed, pressured to 800 p.s.i. with carbon monoxide, then heated to 175° C. and maintained at that temperature while rocking for 4 hours. From the crude product was separated 1 gram pentenoic acid and 1 gram adipic acid.

Example 8

The bomb was charged with 25 grams allyl acetic acid, 75 milliliters acetic acid, 25 milliliters concentrated hydrochloric acid and 0.5 gram palladium chloride, then pressured to 1000 p.s.i. with carbon monoxide. The bomb was heated to 125° C. and maintained, while rocking, at that temperature for 2 hours then heated to and maintained at 175° C. for 2 hours. The final pressure after cooling to room temperature was 750 p.s.i. From the crude product was recovered 8 grams adipic acid, melting point 152° C.

Example 9

The bomb was charged with 10 grams 2-pentenoic acid, 90 milliliters acetic acid, 15 milliliters concentrated hydrochloric acid and 0.5 gram palladium chloride. The bomb was pressured to 800 p.s.i. with carbon monoxide, heated to 100° C. and maintained while rocking at that temperature for 2 hours then heated to and maintained at 150° C., while rocking, for 2 hours. The product was distilled to recover 3 grams adipic acid.

The preceding examples are intended solely to illustrate a preferred mode of practicing my invention and to demonstrate results obtainable thereby. It is not intended that this exemplified disclosure be unduly limiting of the invention but rather it is intended that the invention be defined by the reagents and steps and their obvious equivalents.

I claim:

1. The hydrocarboxylation of conjugated diolefin compounds to form saturated dicarboxylic acids comprising contacting a conjugated diolefin having the structure:

$$CR_2=CRCR=CR_2$$

wherein the R groups are selected from the class consisting of inert alkyl, aryl, nitro, oxyalkyl and carboxy groups and mixtures thereof and wherein the total of carbon atoms is from 4 to about 12;

with carbon monoxide and an aqueous hydrohalic acid selected from the class consisting of hydrobromic and hydrochloric acids in the presence of palladium-containing catalyst at a temperature from about 15° to 300° C. and sufficient pressure from about 1 to 100 atmospheres to maintain liquid phase conditions.

2. The hydrocarboxylation to produce adipic acid according to claim 1 wherein said diolefin is butadiene.

3. The hydrocarboxylation of claim 1 wherein said hydrohalic acid is aqueous hydrochloric acid.

4. The hydrocarboxylation according to claim 1 wherein said conjugated diolefin is reacted with said aqueous hydrohalic acid in the presence of palladium at a temperature from about 15° to about 150° C. to prepare a monocarboxyl product and said product is thereafter contacted with the carbon monoxide in the presence of the aqueous hydrohalic acid and palladium under the reaction conditions of claim 1 to give a dicarboxylic acid.

5. The hydrocarboxylation of claim 1 wherein the contacting is performed in the presence of from 0.001 to 5.0 weight percent of an iron containing cocatalyst.

6. The hydrocarboxylation of claim 5 wherein the cocatalyst is ferrous chloride or triirondodecylcarbonyl.

7. The method of claim 1 wherein said diolefin is a hydrocarbon.

References Cited

UNITED STATES PATENTS 3,065,242  11/1962  Alderson et al. ____ 260—343.6
3,161,672  12/1964  Zachry, et al.

ALEX MAZEL, Primary Examiner

A. M. T. TIGHE, Assistant Examiner

U.S. Cl. X.R.

260—343.6, 537